(12) United States Patent
Shirai

(10) Patent No.: US 8,804,176 B2
(45) Date of Patent: Aug. 12, 2014

(54) PRINTING SYSTEM AND PRINTING METHOD

(71) Applicant: Canon Kabushiki Kaisha, Tokyo (JP)

(72) Inventor: Kenichi Shirai, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/627,238

(22) Filed: Sep. 26, 2012

(65) Prior Publication Data

US 2013/0094053 A1   Apr. 18, 2013

(30) Foreign Application Priority Data

Oct. 14, 2011   (JP) ................... 2011-227440

(51) Int. Cl.
*G06F 3/12* (2006.01)
(52) U.S. Cl.
USPC .......................................... 358/1.15; 358/1.1
(58) Field of Classification Search
None
See application file for complete search history.

(56) References Cited

U.S. PATENT DOCUMENTS

| | | | | |
|---|---|---|---|---|
| 7,330,280 | B2 * | 2/2008 | Kanazawa | 358/1.13 |
| 7,916,323 | B2 * | 3/2011 | Nishiguchi | 358/1.15 |
| 2005/0068566 | A1 * | 3/2005 | Nishiguchi | 358/1.15 |
| 2006/0244995 | A1 * | 11/2006 | Kushida | 358/1.15 |
| 2009/0284785 | A1 * | 11/2009 | Bando | 358/1.15 |
| 2010/0238488 | A1 * | 9/2010 | Alaghband et al. | 358/1.15 |
| 2011/0157631 | A1 * | 6/2011 | Tsutsumi | 358/1.15 |

FOREIGN PATENT DOCUMENTS

JP   2007-250001 A   9/2007

* cited by examiner

*Primary Examiner* — Marcus T Riley
(74) *Attorney, Agent, or Firm* — Carter, DeLuca, Farrell & Schmidt, LLP

(57) ABSTRACT

In a printing system in which a document received from a client terminal is registered in a print service, a fixed code corresponding to the registered document is sent back to the client terminal by e-mail, and when a printer notifies the fixed code, print processing is performed for the document corresponding to the fixed code, the URL of the print service which has registered the document is generated, and the network environment of the client terminal is determined. When it is determined that the network environment is an intranet, the fixed code and generated URL are sent back.

12 Claims, 11 Drawing Sheets

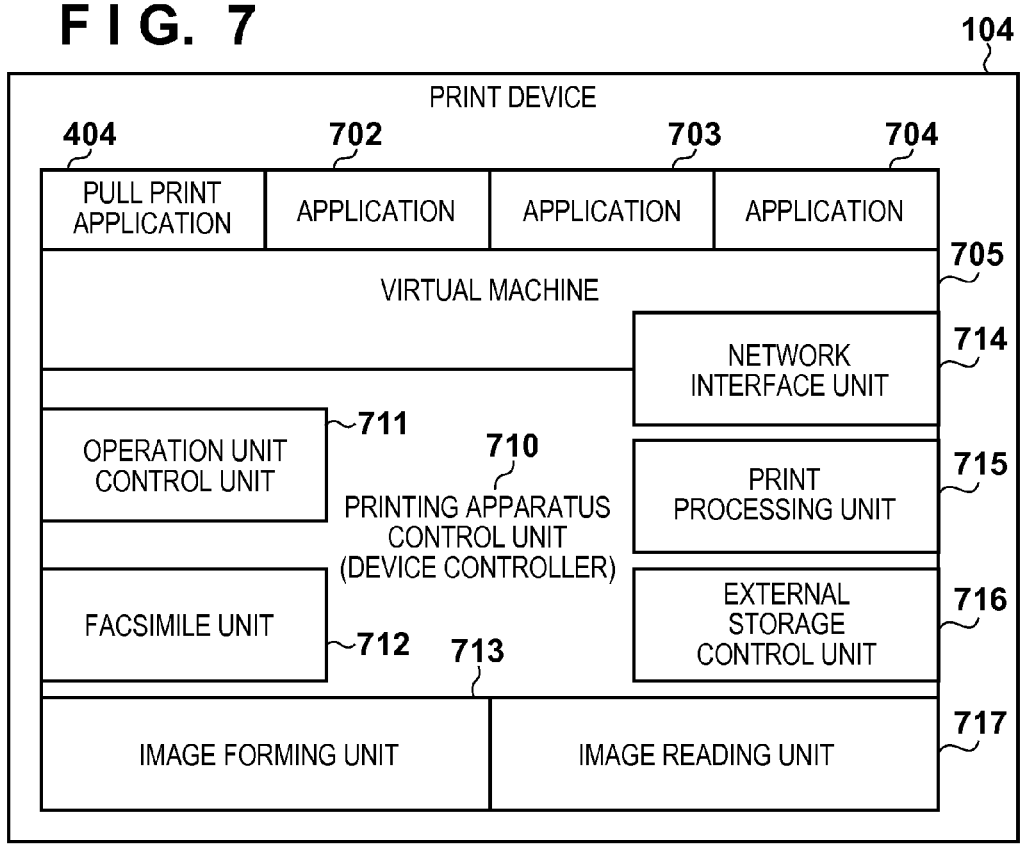

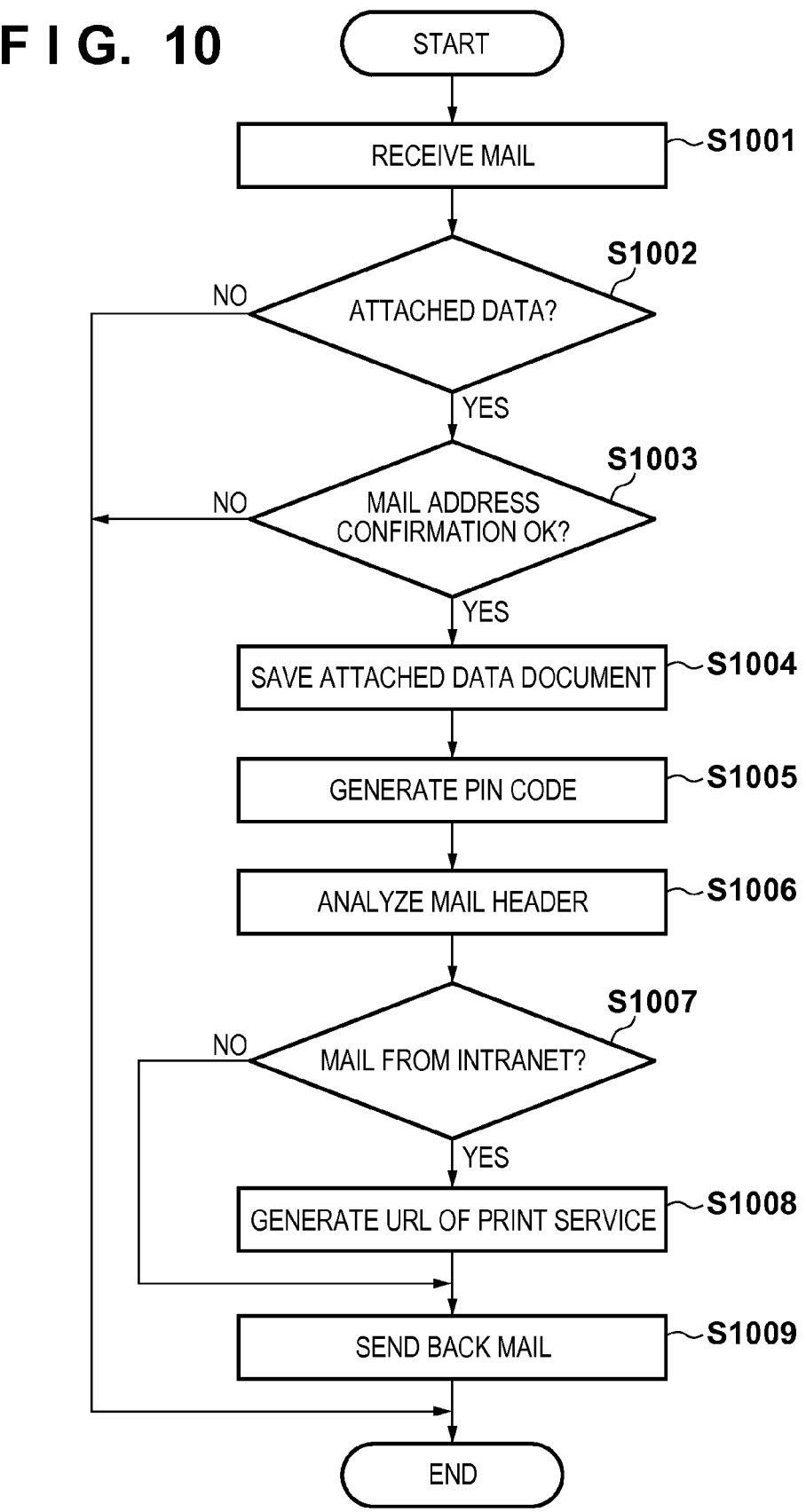

F I G. 11
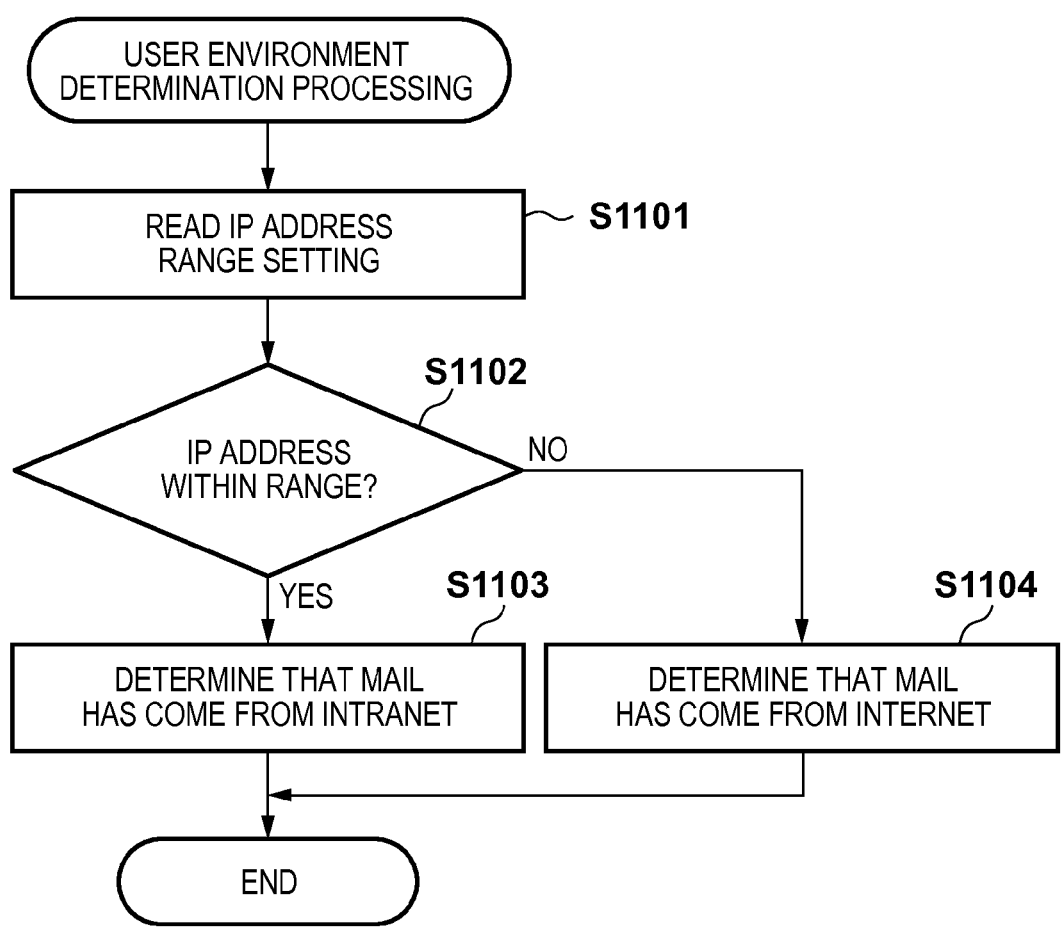

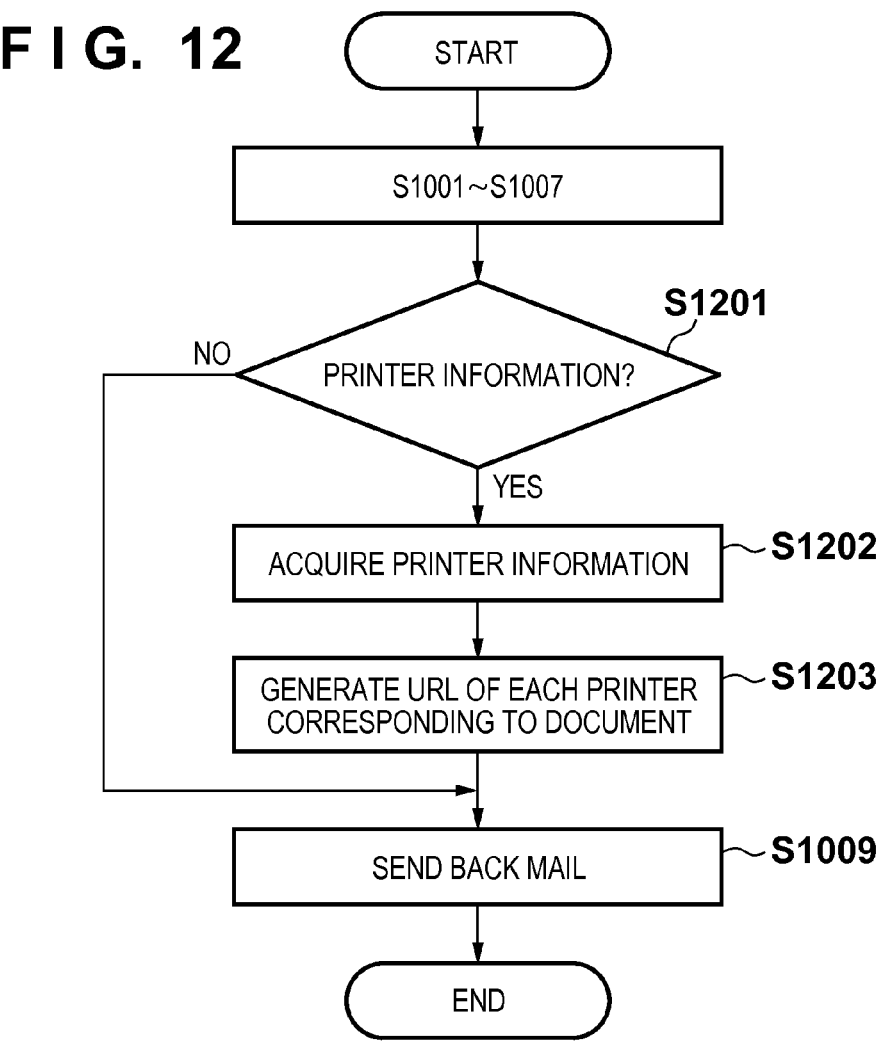

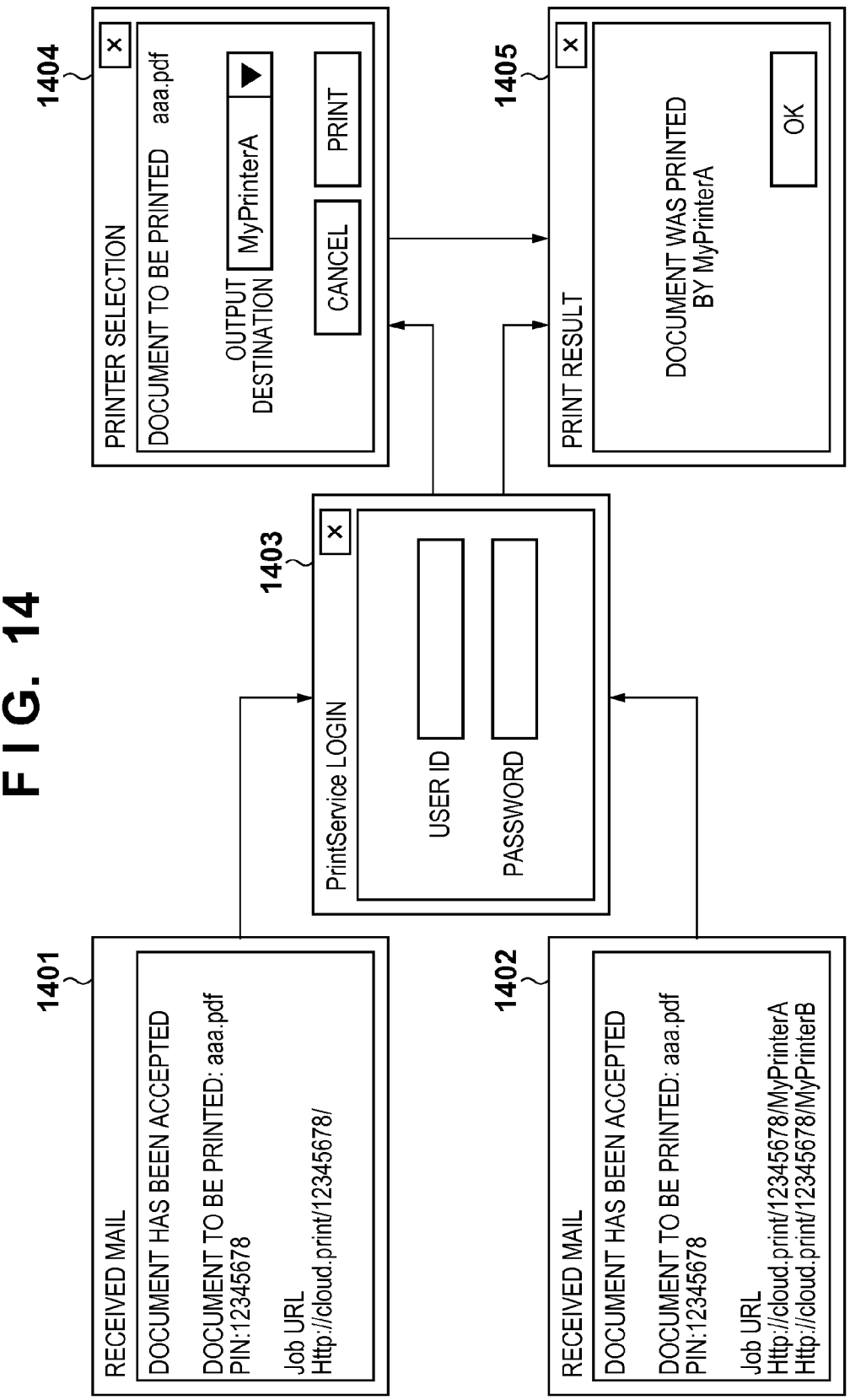

PRINTING SYSTEM AND PRINTING METHOD

BACKGROUND OF THE INVENTION

1. Field of the Invention

The present invention relates to a printing system and printing method for issuing a print instruction, from a client apparatus, for a document registered in a print service.

2. Description of the Related Art

Recently, businesses offering services provided on the Internet as a cloud service that use cloud computing have expanded. Even a print service is desired to be provided on the Internet.

As one print service using a cloud computer, there is a system in which a document to be printed is transmitted as a document attached to an e-mail from a mobile terminal to a print service, and registered. In this system, an identification number (to be referred to as a PIN code) issued upon registering the document is input to a printer to acquire the document corresponding to the PIN code from the server and pull-print.

For example, Japanese Patent Laid-Open No. 2007-250001 proposes a method of storing document data, received from a mobile terminal, in a print server. In this method, a URL indicating the storage location of the document data is transmitted to the mobile terminal by e-mail. The mobile terminal displays the URL without conversion or after converting it into a barcode. A printer receives the URL, acquires the document data present at the location indicated by the URL from the server, and prints.

A PIN code usually has a predetermined period of validity for the sake of security. After the lapse of the period of validity, the PIN code is invalidated. Since a PIN code is transmitted to a document registration source terminal, it is presumed (considered) that only the user who registered the document knows the PIN code. However, the period of validity is short, for security against leakage and the like. In an office or the like where many users share a printer, a user may not be able to input a PIN code, that is, a print instruction within the period of validity, and the PIN code may become invalid. In the method of issuing a PIN code, a user needs to manually input a PIN code via (from) the operation panel of a printer, impairing the operability.

In the method of issuing the URL of the save location of a document, a user needs to input characters other than numerals, impairing the operability much more than by the PIN code. In the method of converting a URL into a barcode, a program for converting a URL into a barcode needs to be installed in a mobile terminal, and a printer also requires a device or processing for reading a barcode. In the invention disclosed in Japanese Patent Laid-Open No. 2007-250001, an issued URL does not have the period of validity, and a user who has issued a print instruction is not authenticated. This may be a security hole in the print server.

In the above methods, the user needs to go to the printer and operate it, which is inconvenient. For example, these methods have not solved the problem that a PIN code may become invalid in an environment where a printer is shared and is not always available.

SUMMARY OF THE INVENTION

The present invention has been made in consideration of the conventional techniques, and embodiments of the invention provide a system and method for sending back the URL of a print service to the user in accordance with the user environment so that he can issue a print instruction to the printer using authentication of the print service.

The present invention in a first aspect provides a printing system in which document data is registered in a print service in accordance with a registration request from a client terminal, and the registered document data is pull-printed from a printing apparatus, the print service including a determination unit configured to determine, in accordance with the registration request for the document data, whether a pull print instruction to the printing apparatus can be issued by communication from the client terminal, and a transmission unit configured to transmit information representing a result of the determination to the client terminal that is a source of the registration request, wherein when the information representing the result of the determination represents that the pull print instruction can be issued by communication, the client terminal transmits the pull print instruction to the printing apparatus by communication.

The present invention in a second aspect provides a print service which registers document data in accordance with a registration request from a client terminal, and transmits the registered document data in accordance with a request from a printing apparatus, comprising: a determination unit configured to determine, in accordance with the registration request for the document data, whether a pull print instruction to the printing apparatus can be issued by communication from the client terminal; and a transmission unit configured to transmit information representing a result of the determination to the client terminal that is a source of the registration request, wherein when the information representing the result of the determination represents that the pull print instruction can be issued by communication, the client terminal transmits the pull print instruction to the printing apparatus by communication.

According to embodiments of the present invention, the URL of a print service is sent back to the user in accordance with the user environment. By using authentication of the print service, the user can issue a print instruction to the printer while maintaining security without setting the period of validity. For example, even after a PIN code is invalidated, the user can issue a print instruction to the printer, and need not go to the printer. In addition, the user need not manually enter a PIN code and URL, and can utilize pull print even by a printer having no program for handling a barcode or a printer having no operation panel for entering a PIN code.

Further features of the present invention will become apparent from the following description of exemplary embodiments (with reference to the attached drawings).

BRIEF DESCRIPTION OF THE DRAWINGS

FIG. 7 is a block diagram hierarchically showing the arrangement of the print device 104;

FIG. 8 is a block diagram exemplifying the software arrangement of a pull print application 404;

FIG. 10 is a flowchart showing processing upon receiving mail;

FIG. 11 is a flowchart showing user environment determination processing;

FIG. 12 is a flowchart showing processing by a mail management service 407 in a modification;

FIG. 13 is a view exemplifying a mail header in the embodiment; and

FIG. 14 is a view showing transition of a screen on the Web browser of a client terminal 103.

DESCRIPTION OF THE EMBODIMENTS

Preferred embodiments of the present invention will now be described in detail with reference to the accompanying drawings.

<Overall System Arrangement>

Figure 1:
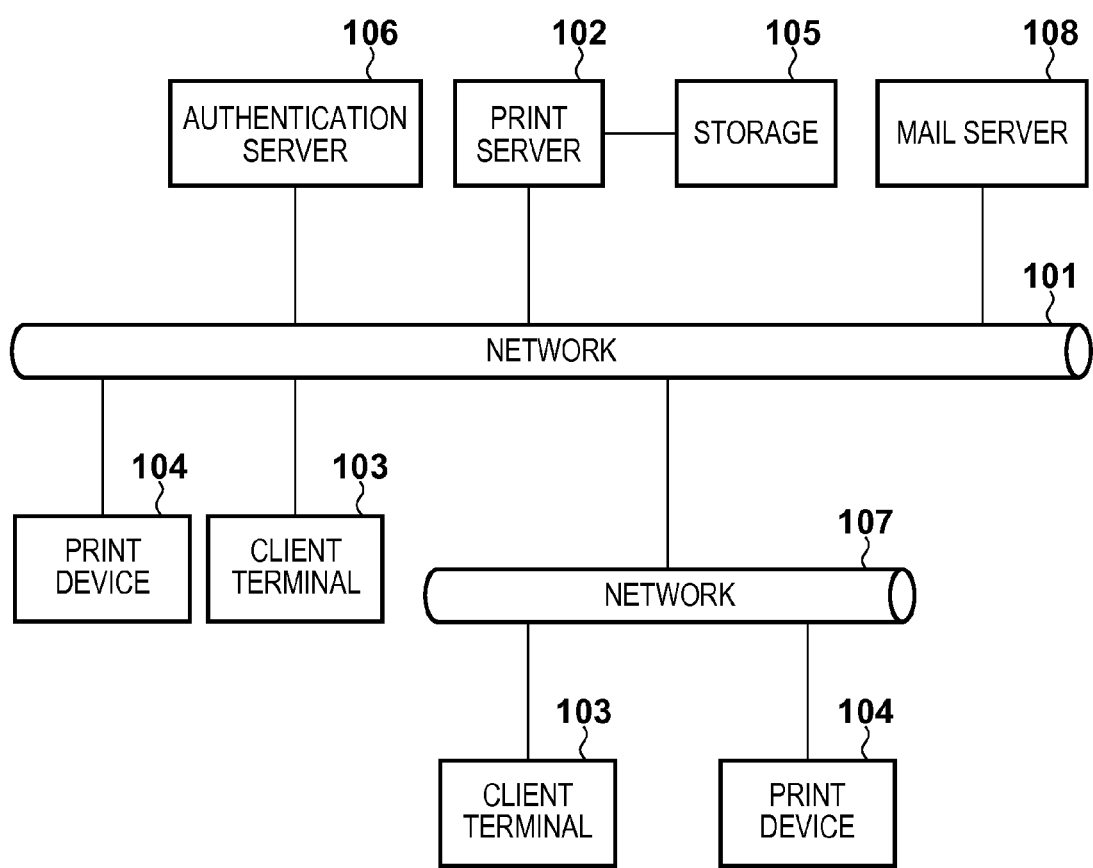
FIG. 1 is a block diagram showing the overall arrangement of a printing system in an embodiment.

The overall arrangement of a printing system in the embodiment will be explained with reference to a block diagram shown in FIG. 1. As shown in FIG. 1, the embodiment assumes that a plurality of client terminals 103 and a plurality of print devices 104 are connected. Communication between apparatuses contained in the printing system may be wired communication using an Ethernet® cable or wireless communication using a radio wave, light, or the like.

Referring to FIG. 1, the client terminals 103, a print server 102, the print devices 104, an authentication server 106, and a mail server 108 are connected via networks 101 and 107. The networks 101 and 107 are communication networks formed from a LAN, WAN, telephone line, dedicated digital line, ATM, frame relay line, cable television line, data broadcasting wireless channel, or the like, or are communication networks implemented by a combination of them. The networks 101 and 107 suffice to transmit data in two ways. Typically, the network 101 is the Internet, and the network 107 is a LAN.

A communication medium from the client terminal 103 to the print server 102 and print device 104, and a communication medium from the print device 104 to the print server 102 may differ from each other. For example, HTTP, FTP, e-mail, and the like may be switched and used. The client terminal 103 is formed from a desktop personal computer, notebook personal computer, mobile personal computer, PDA (Personal Data Assistant), or the like. However, the client terminal 103 may be a cell phone which incorporates a program execution environment. The client terminal 103 incorporates an environment where a program such as a Web browser (Internet browser, WWW browser, or a browser for using the World Wide Web) is executed.

The print server 102 accepts, from the Web browser of the client terminal 103 together with a print request, information which identifies a document to be printed and information which specifies an output destination printer. Upon receiving a print request, the print server 102 sends back, to the Web browser of the client terminal 103, a response screen containing a print command to issue a print instruction. Then, the Web browser of the client terminal 103 can issue the received print command to a designated printer.

When the print device 104 receives a print command from the Web browser of the client terminal 103, it acquires document data to be printed from the print server 102, and prints it. Similarly, when the user enters an identification code (to be referred to as a PIN code hereinafter) from the operation panel of the print device 104 and issues a print instruction, the print device 104 acquires document data to be printed from the print server 102, and prints it. The authentication server 106 manages user information of a user who accesses the print server 102. When the user accesses the print server 102 from the client terminal 103 via the Web browser, the authentication server 106 performs authentication. The print server 102 receives, for example, e-mail from the mail server 108 and transmits, to the mail address of the client terminal 103, e-mail with contents such as a PIN code and the URL of a corresponding print server. The e-mail will be simply referred to as "mail".

<Hardware Arrangement>

Figure 2:
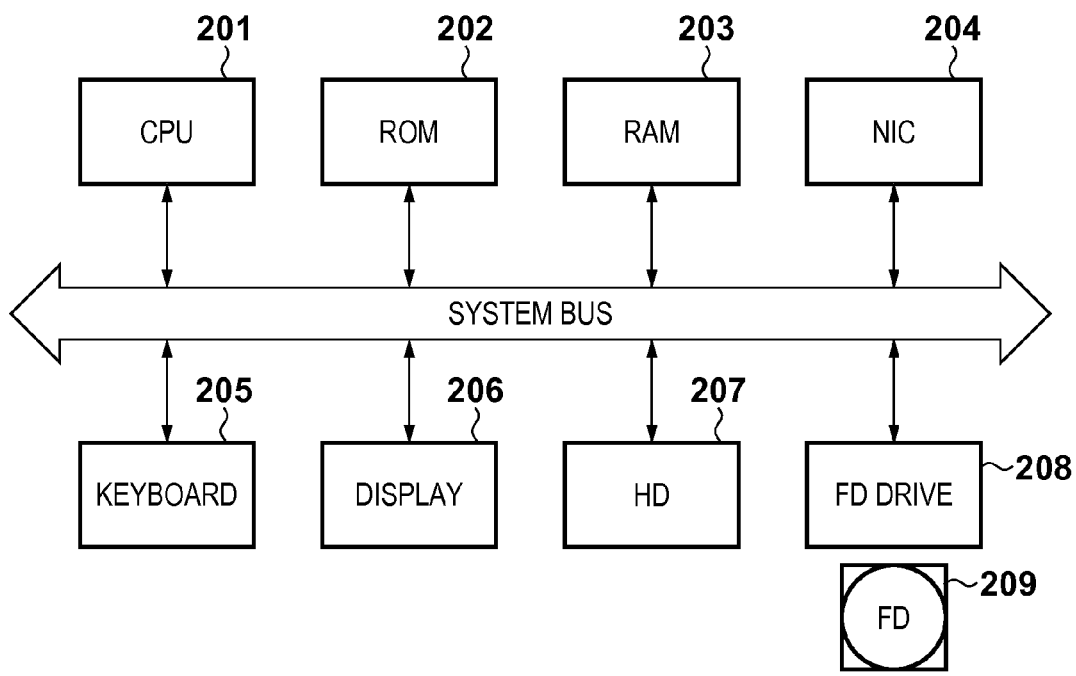
FIG. 2 is a block diagram exemplifying the hardware arrangement of an information processing apparatus.

An example of the hardware arrangements of the print server 102 and client terminal 103 of the printing system in the embodiment will be explained with reference to a block diagram shown in FIG. 2. Note that the authentication server 106 and mail server 108 also have the same arrangement, unless otherwise specified. The present invention is applicable to a system formed from a single device or a plurality of devices as long as the system can execute the functions of the present invention, unless otherwise specified. Further, the present invention is applicable to a system which is connected via a network such as a LAN or WAN and performs processing as long as the system can execute the functions of the present invention, unless otherwise specified.

A CPU 201 functioning as the controller of an information processing apparatus executes a plurality of application programs, a print driver program, an operating system, and a printing system program stored in a hard disk (HD) 207. The CPU 201 also performs control to temporarily store, in a RAM 203, information, files, and the like necessary to execute a program. The CPU 201 opens various registered windows and executes various data processes based on commands designated with a mouse cursor (not shown) on a display 206. Printer creation processing in the embodiment is performed from a window displayed on the display of the client terminal 103.

A ROM 202 serving as a nonvolatile memory internally stores programs such as a basic I/O program, and various data such as font data and template data used in document processing. The RAM 203 serving as a temporary memory functions as a main memory, work memory, and the like for the CPU 201. A NIC (Network Interface Controller) 204 serving as an input/output interface is used when the information processing apparatus exchanges data with an external apparatus.

A keyboard 205 functioning as an instruction input unit is used when the user inputs a command and the like to the print server 102 and the like. The display 206 functioning as a display unit displays a command and the like input from the keyboard 205. The HD 207 serving as an external storage and functioning as a large-capacity memory stores application programs, a print driver program, an OS (Operating System), and the like.

Figure 3A:
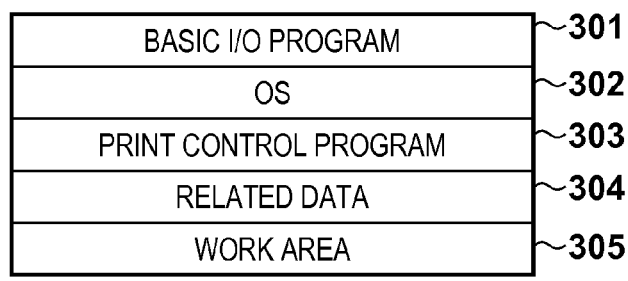
FIG. 3A is a view exemplifying the memory map of a RAM 203.

An example of the memory map of the RAM 203 shown in FIG. 2 will be explained with reference to FIG. 3A. FIG. 3A shows a memory map in a state in which a print control program is loaded into the RAM 203 and becomes executable. The program is recorded on a storage medium such as an FD (Flexible Disk) 209 or the like, and read via an FD drive 208.

In this example, the print control program and related data are directly loaded from the FD 209 into the RAM 203, and executed. Alternatively, the print control program may be loaded into the RAM 203 from the HD 207 in which the print control program has already been installed. The medium which stores the print control program may be a CD-ROM, CD-R, PC card, DVD, or IC memory card, other than the FD 209. The print control program can also be stored in the ROM 202 to form part of the memory map, and can be directly executed by the CPU 201. Software which implements the same functions as those of the above units can replace a hardware device.

In the RAM 203, programs corresponding to the respective areas of a basic I/O program 301, OS 302, print control program 303, and related data 304 are loaded, and a work area 305 is ensured. The basic I/O program 301 is a program having, for example, an IPL (Initial Program Loading) function of loading an OS from the HD 207 into the RAM 203 and starting the OS operation upon turning on the information processing apparatus.

Figure 3B:
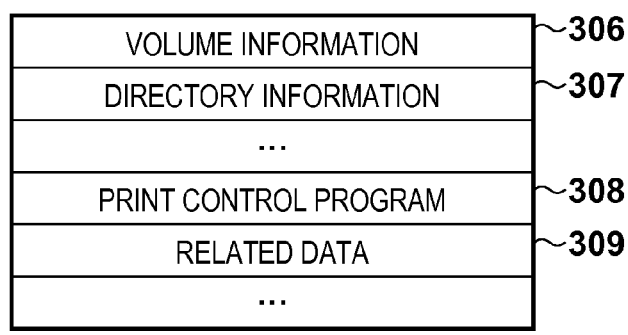
FIG. 3B is a view exemplifying the memory map of an FD 209.

An example of the memory map of the FD 209 shown in FIG. 2 will be explained with reference to FIG. 3B. As shown in FIG. 3B, the FD 209 stores volume information 306 and directory information 307 representing data information, and further stores a print control program 308 and related data 309. The print control program 308 is a program based on a flowchart to be described later, and the print server 102 adopts the same arrangement in the embodiment.

<Arrangement of Printing System>

Figure 4:
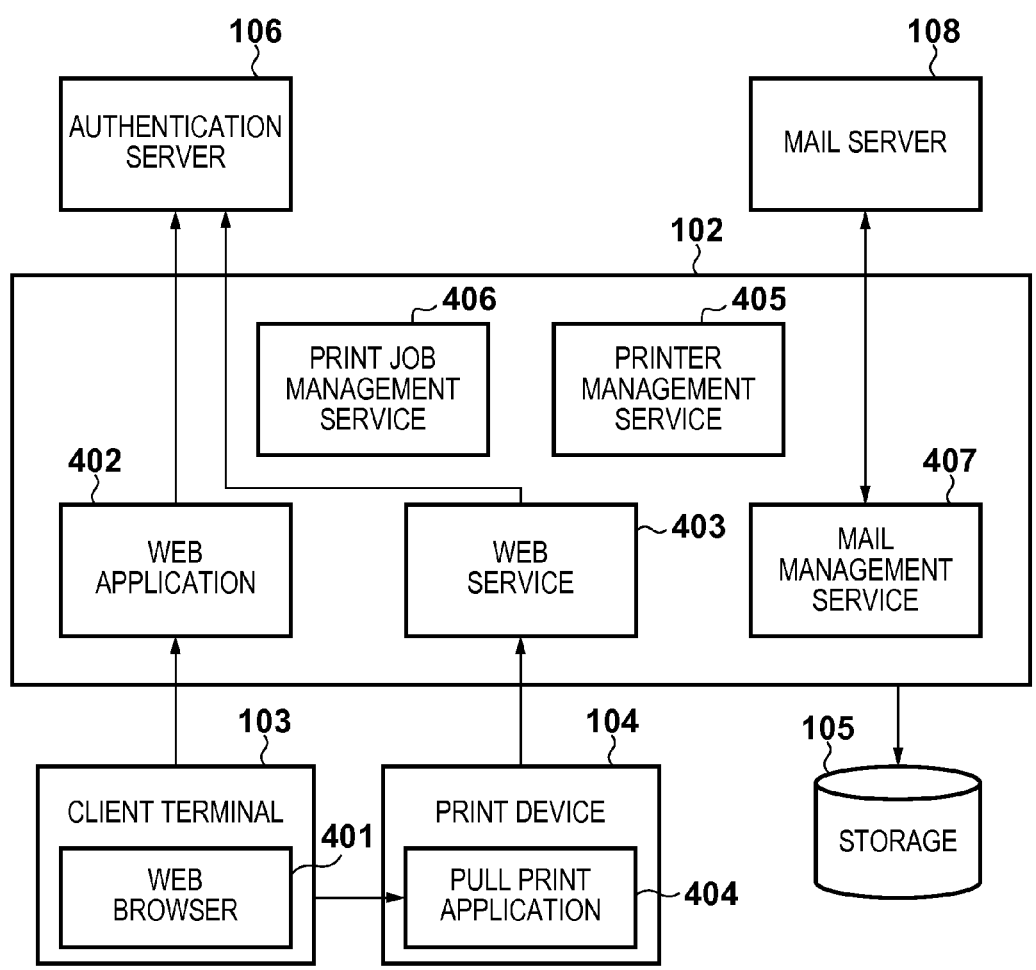
FIG. 4 is a block diagram exemplifying the arrangement of a printing system in the embodiment.

An example of the software arrangement of the printing system in the embodiment will be explained with reference to FIG. 4. The print server 102 includes a print job management service 406 which manages a print job. The print job management service 406 stores, as print data in a storage 105, document data or the like input from another service or another program. In the embodiment, document data attached to mail is stored in the storage 105. The data format of print data is a predetermined format such as PDL or PDF. The print job management service 406 may convert document data into a predetermined format and save it. The storage 105 is a storage device such as an HDD incorporated in the print server 102, an externally connected HDD, or a network storage. In response to a print data request from the print device 104 which has accepted a print instruction such as a print command, the print job management service 406 transmits corresponding print data to the request source.

A Web application 402 creates a Web page displayable by a Web browser 401 running on the client terminal 103, and sends back the created Web page in response to a request from the Web browser 401. The Web application 402 sends back print data in response to a print job acquisition request, and receives the status of a job in print processing to be executed in the print device 104. For descriptive convenience, FIG. 4 does not illustrate an HTTP server which accepts an HTTP request from an HTTP client (Web browser). The Web application 402 and a Web service 403 are applications which provide services on the HTTP. The Web application 402 and Web service 403 accept requests via an HTTP server (not shown), and function as back-ends. However, in the description of the embodiment, the Web application 402 and Web service 403 directly accept a request from the Web browser 401 or a pull print application 404. This also applies to the following description.

The pull print application 404 activated in the print device 104 accepts a print command from the Web browser 401, and a print request input from the operation panel of the print device 104. In accordance with the accepted print instruction, the pull print application 404 requests print data from (of) the print server 102.

A mail management service 407 of the print server 102 periodically acquires information from the mail server 108. When document data is attached to mail received from the mail server 108, the authentication server 106 tries to authenticate the mail address. If the authentication is successful, the mail management service 407 stores the attached document data in the storage 105 via the print job management service 406.

Figure 9A:
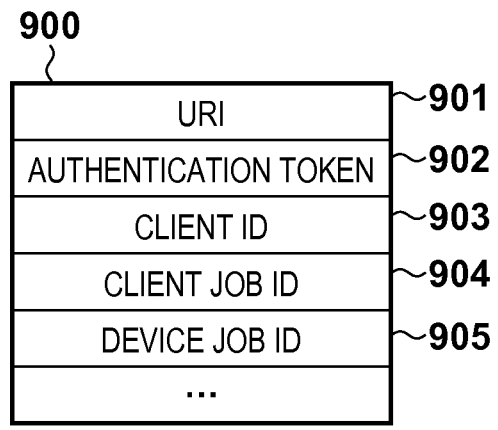
FIG. 9A is a view showing print queue information.
Figure 9B:
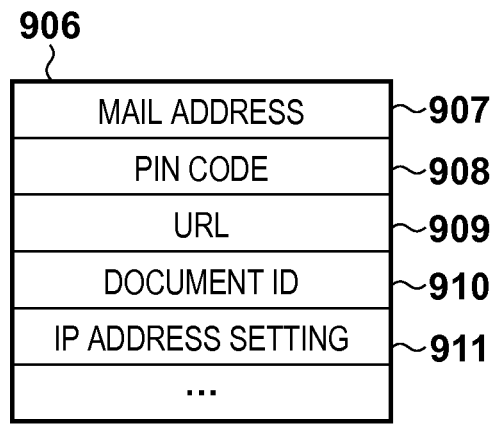
FIG. 9B is a view showing user information.
Figure 9C:
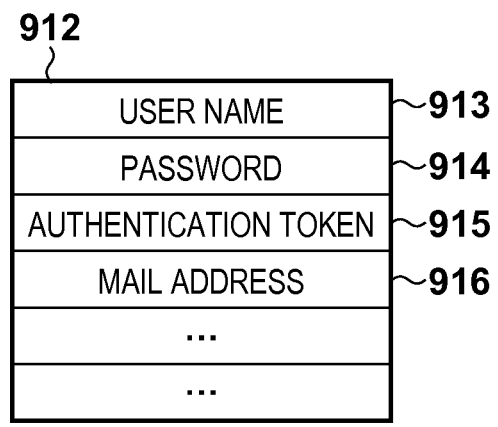
FIG. 9C is a view showing authentication information.

The authentication server 106 holds authentication information 912 as shown in FIG. 9C. In this example, the authentication information 912 includes a user name 913, password 914, authentication token 915, and user mail address 916 used to access the print server 102 by the user of the client terminal 103. Upon receiving a user authentication request together with authentication information, the authentication server 106 refers to the registered authentication information, and if the received information matches the registered authentication information, sends back an authentication success response to the request source.

When the Web application 402 or Web service 403 of the print server 102 receives a request from the client terminal 103 or print device 104, it sends an authentication request to the authentication server 106. The user of the Web application 402 is authenticated by collating a user name and password which are input from a login Web page displayed on the Web browser 401 and contained in a login request, with the user name 913 and password 914 held in the authentication server 106. If the authentication using the user name and password is successful, the authentication server 106 issues the authentication token 915 to the authenticated user. The authentication token 915 is transmitted to the Web browser 401 serving as the authentication request source. The authentication token 915 is further transferred from the Web browser 401 to the pull print application 404 together with a print command. When requesting print data of the print server 102 in accordance with the print command, the pull print application 404 first presents the transferred authentication token to the Web service 403, and then can receive authentication from the authentication server 106. This can ensure the security of pull print in the embodiment. The authentication token is also usable when the user accesses the print server 102 via the Web browser. A period of validity can also be set for the authentication token. Although the period of validity of the authentication token depends on the authentication server 106, a much longer period of validity (for example, several hours or several days) than that of a PIN code can be generally set. The period of validity may be set separately for the authentication token used in pull print.

Note that the print job management service 406, a printer management service 405, the Web application 402, the Web service 403, and the mail management service 407 are independent programs, and can be installed in separate information processing apparatuses. These programs are installed in network-connected information processing apparatuses and communicate with each other. These programs can also be installed in a single information processing apparatus.

<Print Server>

Figure 5:
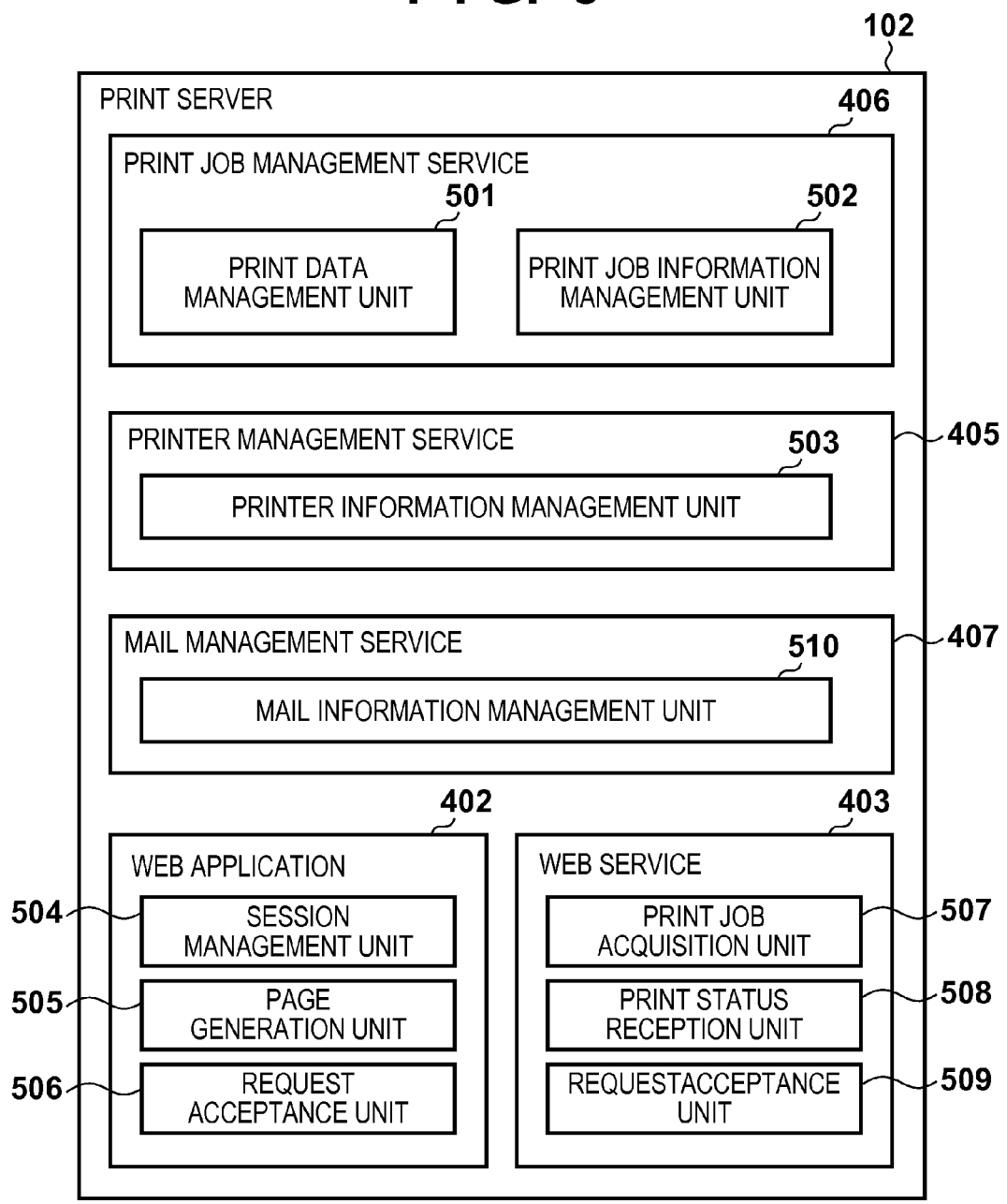
FIG. 5 is a block diagram exemplifying the software arrangement of a print server 102.

An example of the software arrangement of the print server 102 in the embodiment will be explained with reference to FIG. 5. Each software module of the print server 102 is stored in the HD 207 shown in FIG. 2, loaded into the RAM 203, and executed by the CPU 201, as described above.

In the print server 102, a print data management unit 501 of the print job management service 406 manages print data. Upon receiving a print data acquisition request from the Web service 403, the print data management unit 501 acquires designated print data from the storage 105, and transfers it to the Web service 403.

A print job information management unit 502 manages print job information of print data managed in the storage 105. The job information includes information such as a document ID, client job ID, device job ID, document name, job type, print status, acceptance date & time, final printing date & time, user name, page count, page size, and print data link destination. The document ID is an ID for uniquely identifying print data in the print server 102. The client job ID is an ID which is issued by the client terminal 103 to uniquely identify a print job for each client terminal. The device job ID is a job ID in the print device 104 that is issued by the pull print application 404. The job type represents a data format such as PDL or PDF. The print status includes statuses such as waiting, transferring, printing, normal end, and error end.

A printer information management unit 503 of the printer management service 405 manages printer information of the print device 104 managed by the print server 102. The printer information includes, for example, a printer name, MAC address, and URI. The MAC address is information for uniquely identifying each print device. The URI is an end point which receives a print request (print command) by the pull print application 404 from the client terminal 103.

A session management unit 504 of the Web application 402 manages, as a session, a request from the Web browser 401 successfully authenticated by the authentication server 106. A page generation unit 505 creates a page screen to be displayed on the Web browser 401 in response to a request from the Web browser 401, for example, a login screen or a screen for a print instruction, and sends it back to the Web browser 401. A request acceptance unit 506 accepts an event registration request, print request, and the like from the Web browser 401.

A request acceptance unit 509 of the Web service 403 accepts a print data acquisition request and print job status from the pull print application 404. When the request acceptance unit 509 accepts the print data acquisition request, a print job acquisition unit 507 issues a print data acquisition request to the print job management service 406. Also, the print job acquisition unit 507 transmits print data acquired from the print job management service 406 to the pull print application 404. A print status reception unit 508 notifies the job management service 406 of a print job status accepted by the request acceptance unit 509. The job management service 406 specifies the notified print job and updates the status.

A mail information management unit 510 of the mail management service 407 stores document data attached to received mail in the storage 105. The mail information management unit 510 generates a PIN code and a URL corresponding to user environment determination processing (to be described later), and sends back mail describing the generated information to the mail transmission source.

Note that the embodiment describes processing for document data received by mail, but document data may be received via the Web service 403. A PIN code and a URL corresponding to a condition can similarly be transmitted for data received via the Web service 403. In this case, the destination mail address is attached to document data, or registered in advance in association with a user ID. The mail information management unit 510 generates user information 906 for each user upon receiving mail, and manages it till the end of a print job having a document ID 910.

<Hardware Arrangement of Print Device>

Figure 6:
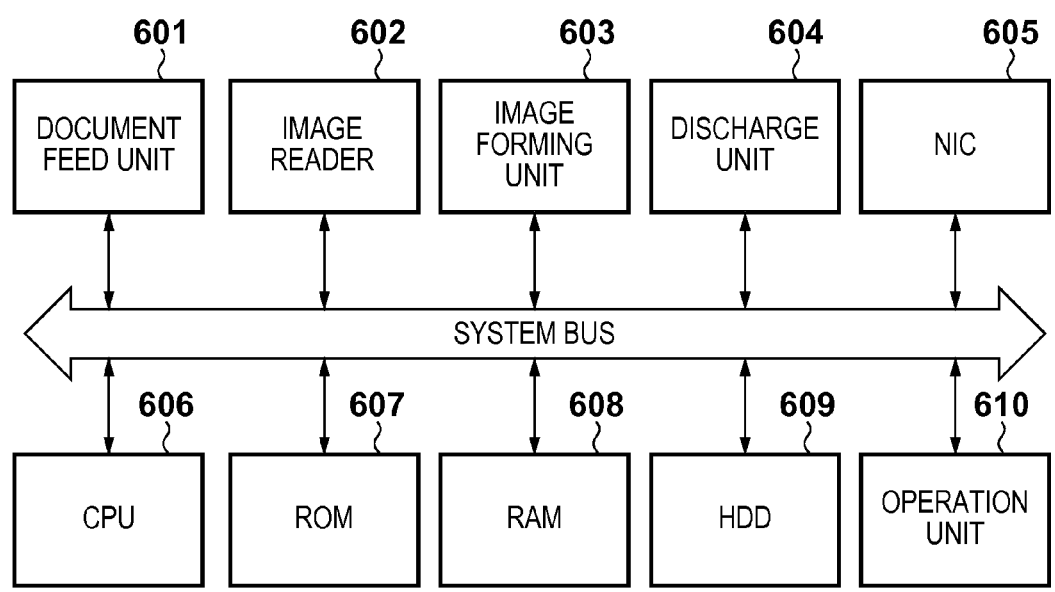
FIG. 6 is a block diagram exemplifying the hardware arrangement of a print device 104.

An example of the hardware arrangement of the print device 104 will be described with reference to FIG. 6. An image reader 602 reads a document fed from a document feed unit 601. The image reader 602 and an image forming unit 603 convert a read document or data received via a network into a print image, and print it out. A discharge unit 604 discharges printout paper, and performs post-processes such as sorting and stapling. A NIC 605 is connected to a LAN or the Internet via a network, and exchanges information with the outside.

A CPU 606 loads a program stored in a ROM 607 or HDD 609 into a RAM 608, and executes processing based on the program to control the respective units of the apparatus (print device). The ROM 607 serving as a nonvolatile memory stores programs and data regarding respective processes of the apparatus. The rewritable RAM 608 electrically stores temporary data regarding respective processes of the apparatus. The HDD 609 stores programs, data, temporary data, and the like regarding respective processes of the apparatus. An operation unit (operation panel) 610 displays a screen, and accepts an operation instruction from the user via the screen.

In the embodiment, the print device suffices to have a network connection function and printing function as hardware, and the document feed unit 601 and image reader 602 may be omitted. The HDD 609 and operation unit 610 are not indispensable (so may also be omitted).

<Software Arrangement of Print Device>

The functions of the print device 104 will be explained with reference to FIG. 7 hierarchically showing the arrangement of the print device 104. An image forming unit 713 executes a series of image forming processes such as paper handling, image transfer, and fixing, and forms an image on a printing medium such as printing paper. The image forming unit 713 includes, for example, an inkjet printer or electrophotographic image forming unit. An image reading unit 717 includes a scanner and the like. The image reading unit 717 optically reads a document image and converts it into digital image information. The image reading unit 717 outputs the digital image information to the image forming unit 713 to form an image, or transmits it to an external apparatus via a facsimile unit 712, network interface unit 714, or the like.

A device controller 710 controls the operations of the image forming unit 713 and image reading unit 717. For example, the device controller 710 controls the image forming unit 713 to copy document information read by the image reading unit 717. The device controller 710 includes the network interface unit 714, a print processing unit 715, the facsimile unit 712, and an operation unit control unit 711, and controls exchange of information between these units. The facsimile unit 712 transmits/receives a facsimile image, that is, executes processing of transmitting digital image information read by the image reading unit 717, or decoding a received facsimile signal and printing by the image forming unit 713.

The operation unit control unit 711 controls to generate a signal corresponding to a user operation using the operation panel of the operation unit 610, or display various data, messages, and the like on the operation unit (or display unit). The print processing unit 715 controls, for example, to process print data input via the network interface unit 714, output it to the image forming unit 713, and print. The network interface unit 714 controls data transmission/reception to/from another communication terminal via a communication link.

A virtual machine 705 is positioned above the device controller 710, and can control the device controller 710. Both the device controller 710 and virtual machine 705 can directly use the network interface unit 714 to independently access external networks. Applications described in a programming language corresponding to an API (Application Programming Interface) provided by the virtual machine 705 exist above the virtual machine 705. The applications control the operation of the virtual machine 705 via the API. These applications can work on the device controller 710 indirectly via the virtual machine 705, and can operate the image forming unit 713 and image reading unit 717.

Note that the embodiment adopts the pull print application 404 as an application. Details of the pull print application will be described with reference to FIG. 8. These applications can be uninstalled from the virtual machine 705 or newly installed as applications 702 to 704. The application is described as an application installed in the print device 104, but may be arranged as hardware. Alternatively, the application may be an application in a computer communicably connected to the print device 104 as an external apparatus.

An external storage control unit 716 converts an image read by the image reading unit 717 into a data format savable in an external storage by the image forming unit 713, and saves the converted image in the external storage. The external storage control unit 716 reads out data saved in the external storage, performs print processing via the image forming unit 713, and network-transmits the data to the outside via the network interface unit 714.

<Pull Print Application 404>

An example of the software arrangement of the pull print application 404 in the embodiment will be described with reference to FIG. 8. Each software module of the pull print application 404 is stored in the HDD 609, loaded into the RAM 608, and executed by the CPU 606, as described above.

A Web service acceptance unit 810 of the pull print application 404 accepts an event registration request, print command (print request), and the like from the Web browser 401. Upon receiving an event registration request, the Web service acceptance unit 810 notifies a print control unit (job status monitor) 816 of event registration information. The event registration information includes the URI of an event transmission destination, and a client ID for identifying a client. Upon receiving a print request, the Web service acceptance unit 810 notifies a print job acquisition unit 812 of print request information. The print request information includes a URI 901, authentication token 902, client ID 903, and client job ID 904 which are contained in the received print request.

Upon receiving a print data acquisition request from the print job acquisition unit 812, a Web service transmission unit 811 acquires print data from the Web service 403, and transfers it to the print job acquisition unit 812. Upon receiving a status notification request from the print control unit 816, the Web service transmission unit 811 notifies the Web service 403 of a print job status.

The print job acquisition unit 812 manages acquisition of print data based on print queue information 900 in FIG. 9A. FIG. 9A shows print queue information corresponding to one print job. When a plurality of print jobs are registered in the queue, information sets are registered by the number of print jobs. The print queue information 900 is print job queue information including the URI 901, the authentication token 902, the client ID 903, the client job ID 904, and a device job ID 905. The URI 901 indicates a print data save destination. In the embodiment, the URI of the Web service 403 is registered. In printing based on PIN code input, an input PIN code is registered. The authentication token 902 is an authentication token issued by the authentication server 106. The authentication token 902 received from the Web browser 401 together with a print command is added to a print request, and transmitted to the Web service 403. The authentication token is transferred to the authentication server 106, and collated with a registered authentication token to perform authentication. The client ID 903 is an ID for identifying a client. In the embodiment, the URI of the Web service 403 is registered as the client ID. The client job ID 904 is an ID which is issued by the client terminal 103 to identify a job. In the embodiment, a UUID (Universally Unique IDentifier) issued by the print server 102 is registered in the client job ID. The device job ID 905 is an ID for identifying a job to be executed by the print device 104. In the embodiment, a value obtained by incrementing an integer starting from 1 by the print server 102 in the acceptance order of print requests is registered.

The print job acquisition unit 812 registers, at the end of the print queue information 900, the print request information notified from the Web service acceptance unit 810 in response to a transmitted print request. The print request information transferred in response to the print request includes information to be registered in the print queue information 900, such as the URI 901, authentication token 902, client ID 903, and client job ID 904. The print job acquisition unit 812 acquires print data via the Web service transmission unit 811 based on print job information at the start of the print queue information 900. In the embodiment, print data registered at a location indicated by the URI 901 is acquired from the Web service 403.

A pull print controller 813 manages the overall operation of the pull print application 404. An operation instruction to each unit and the like are issued via the pull print controller 813.

<Mail Management Service Processing>

Processing when the print server 102 receives mail from the client terminal 103 via the mail server 108 will be described with reference to a flowchart shown in FIG. 10. This processing will be explained as processing for document data received by mail. However, for data received directly via the Web service 403, a PIN code and URL can similarly be transmitted by mail. In such a case, a source IP address of a packet carrying the received data is analyzed in step S1006 rather than the mail header in order to determine whether the data was received from the intranet or not.

In step S1001, the mail information management unit 510 of the mail management service 407 receives mail from the mail server 108. Note that the reception method is assumed to be a method of periodically inquiring from the mail information management unit 510 to the mail server 108 for mail, but is not particularly limited to this method.

In step S1002, the mail information management unit 510 confirms whether the received mail has attached data e.g. an attached file or attached document. If the received mail has attached data, the process advances to step S1003; if the received mail does not have attached data, the process ends. In step S1003, the mail information management unit 510 inquires whether the mail address of the received mail is managed by the authentication information 912 in the authentication server 106. If the mail address is managed by the authentication information 912, the process advances to step S1004; if it is not managed by the authentication information 912, the process ends.

In step S1004, the mail information management unit 510 saves, in the storage 105, the attached data of the received mail via the print job information management unit 502. The print job information management unit 502 issues a document ID. The mail information management unit 510 stores the mail address and document ID in a mail address area 907 and the document ID area 910 in the user information 906 of FIG. 9B. If necessary, the data may be converted into a predetermined format such as PDF or PDL and then saved.

In step S1005, the mail information management unit 510 generates a PIN code and stores it in a PIN code area 908 of the user information 906. In step S1006, the mail information management unit 510 analyzes header information of the received mail, and acquires the IP address of the transmission source. For the PIN code, a predetermined period of validity is also registered. When a fixed period of validity is determined in advance, registration of the period of validity can be omitted by hard-coding the fixed period of validity.

In step S1007, the mail information management unit 510 determines, from the IP address acquired in step S1006, whether the network environment (user environment) of the mail transmission source is an intranet or another network (for example, Internet). This determination method will be further described later with reference to a flowchart shown in FIG. 11.

If the mail information management unit 510 determines in step S1007 that a mail has come from an intranet serving as the user environment of the mail transmission source, the process advances to step S1008. In step S1008, the mail information management unit 510 generates the URL of a print service to be provided to the print-designated document, and stores the generated URL in a URL area 909 of the user information 906. The URL of the print service is that of the print server 102. In step S1009, the mail information management unit 510 describes, in the mail body, the PIN code generated in step S1005 and the URL generated in step S1008, and sends back the mail to the user of the transmission source via the mail server 108.

If the mail information management unit 510 determines in step S1007 that a mail has not come from an intranet serving as the user environment of the mail transmission source, the process advances to step S1009. In step S1009, the mail information management unit 510 describes only the PIN code generated in step S1005 in the mail body, and sends back the mail to the user of the transmission source via the mail server 108.

The embodiment solves the problem of PIN code input by issuing a print instruction to the print device using communication without using a PIN code. However, several problems occur when issuing a print instruction from the client terminal to the print device using communication. One problem is a firewall. When the client terminal and print device belong to different networks, the firewall generally blocks a request from outside the network. When a pull print instruction is given to the print device by communication, a printed material may be taken away from the print device by a person other than the user who issued the print instruction.

To prevent this, the embodiment executes steps S1007 and S1008 in FIG. 10. If a client requesting registration of a document belongs to an intranet, a print device in the same network is highly likely to be used. In this case, even if a printed material is left in the printer, a security problem is considered to hardly occur.

More specifically, in step S1007, it is determined whether a pull print instruction can be issued from the client terminal to the printing apparatus by communication. Step S1008 is a step of, if it is determined in step S1007 that a pull print instruction can be issued by communication, transmitting information (that is, the URL of a print service) representing the determination result to the client terminal serving as the registration request source.

When the information representing the result of step S1007 indicates that the pull print instruction can be issued by communication, that is, the information is a URL, the client terminal transmits a pull print instruction to the printing apparatus by communication. However, the pull print instruction is transmitted after login authentication so is not transmitted immediately.

<User Environment Determination Processing>

The above-mentioned user environment determination processing will be explained with reference to a flowchart shown in FIG. 11. In step S1101, the mail information management unit 510 acquires IP address setting information from an IP address setting information area 911 of the user information 906. The IP address setting information is set in advance by the Web application 402, and stores an IP address or IP address range used in an intranet. When no IP address setting information is set, an IP address (private IP address) freely usable by a terminal present in an office network such as a LAN is used as IP address setting information.

In step S1102, the mail information management unit 510 compares the IP address acquired in step S1003 with the IP address setting information. If the IP address acquired in step S1003 falls within the range of the IP address setting information as a result of the comparison, the process advances to step S1103 to determine that the mail has come from the intranet. If the IP address does not fall within the range of the IP address setting information, the process advances to step S1104 to determine that the mail has come from the Internet.

FIG. 13 is a view exemplifying a main header in the embodiment. The mail information management unit 510 analyzes header information 1301 of received mail, and acquires the IP address of the transmission source. More specifically, the mail information management unit 510 acquires an IP address described in Received information 1302 present at the bottom of the header information 1301.

Transition of a screen when the client terminal 103 receives mail in the embodiment will be described with reference to a schematic view shown in FIG. 14. FIG. 14 shows a case in which a URL generated in step S1008 of FIG. 10 is attached to the mail transmitted in S1009. A screen 1401 (as displayed on the display 206 of the client terminal 103), represents the body of received mail, and describes a document name, PIN code, and URL (Job URL) saved in the print server 102. When the user selects Job URL in the screen 1401, the Web browser 401 of the client terminal 103 is activated, and a login screen 1403 for the authentication server 106 appears to access the Web application 402. When the user logs in with a correct user ID and password, the client terminal 103 receives an authentication token corresponding to the login user from the authentication server 106, and displays a selection screen 1404 for the output destination (printer) of the print server 102. When the period of validity is set for the authentication token, the authentication server 106 sets the period of validity to expire after the period of validity of a PIN code issued in step S1005. Alternatively, no period of validity may be set. Output destinations displayed on the selection screen 1404 are, for example, a list of printers corresponding to printer addresses registered in advance for respective users. More preferably, for example, printers belonging to the same network as the client terminal, serving as the transmission source of mail having a document to be registered, are displayed as output destination choices. When the user selects an output destination and presses a print button on the selection screen 1404, a print instruction, that is, a print request or print command can be issued to the printer (print device 104 in this example). The print request is transmitted to the print device together with print data identification information (document ID) and authentication token via the network to which they both belong, if the selected print device exists in the same network as that of the client, or via the Internet. When the print request is transmitted via the Internet, it is highly likely to be blocked by the firewall of a network to which the print device belongs. However, when the client terminal and selectable print device exist in the same network, blocking of the request by the firewall can be prevented by issuing a URL. When the print device 104 which has received the print request operates normally and accepts the print request, the pull print application 404 operates according to the above-described procedures to acquire designated print data and print. If printing has succeeded, a print result screen 1405 appears. If printing has failed, a screen representing a message to this effect appears. A screen 1402 is a modified screen which will be explained later.

Although not shown, when only a PIN code is described in mail (so when the result of the determination in S1007 is NO), the user manually enters the PIN code displayed in the mail from the operation panel of the print device 104, and issues a print instruction, similar to the conventional technique.

An update procedure is set separately when the period of validity of the authentication token has elapsed (or the period of validity has expired). The procedure may be configured so that the user logs in again to the print server 102 and transmits an authentication token whose period of validity has elapsed, and the print server 102 issues a new authentication token. This is merely an example, and if the period of validity has elapsed, registered print data may be deleted so the procedure has to be executed again from registration.

In the embodiment, whether to send back a URL is determined in accordance with whether the transmission source in registering a document exists in the Internet or an intranet. However, a URL may be sent back unconditionally without performing steps S1006 and S1007. In this case, a print request may not reach the destination owing to the firewall, or a printed material may be read or taken away by a person other than the user who issued the print instruction. However, the problem accompanying PIN code input can be solved.

By transmitting the URL of the print server to the client terminal, the authentication server can be used via the print server upon receiving a print instruction. A print request from the print device is authenticated based on an acquired authentication token. Even after a PIN code is invalidated, a print instruction can be issued safely. Since a print instruction can be issued to the print device via communication, neither a PIN code nor URL need be input from the print device for the print instruction, improving user friendliness.

[Modification]

The modification adds processing by the mail management service when printer information of a user who has transmitted mail exists in the printer management service 405. Processing by the mail management service 407 in the modification will be explained with reference to a flowchart shown in FIG. 12. Note that the system arrangement, client terminal arrangement, respective server arrangements, and print device arrangement are the same as those in the embodiment, and a description thereof will not be repeated.

In the modification, as shown in FIG. 12, processing after it is determined in step S1007 shown in FIG. 10 that mail has come from an intranet will be explained. In step S1201, the mail information management unit 510 determines whether printer information of a user corresponding to the mail address can be acquired from the printer information management unit 503 of the printer management service 405. Note that printer information of a user corresponding to the mail address is desirably information for specifying a printer belonging to the same network as a network to which the client terminal serving as the transmission source of mail belongs. If the printer information can be acquired, the process advances to step S1202, and the mail information management unit 510 acquires, from the printer information management unit 503, the printer information of the user corresponding to the mail address. In step S1203, pieces of URL information are created from (by) the number of pieces of printer information acquired in step S1202. The URL information includes a print server, a document to be printed, and an output destination printer name. If the mail information management unit 510 determines in step S1201 that the printer information cannot be acquired, the process directly advances to step S1009.

In this modification, the received mail 1402 describes URLs each containing an output destination (see FIG. 14). When the user selects a URL and authentication on the login screen 1403 is performed successfully, the output destination selection screen 1404 is skipped, and the print result screen 1405 appears.

In the modification, upon selection of a URL by the user, the authentication server 106 can perform authentication, and the user can issue a print instruction without performing a further operation to select an output destination.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-227440, filed Oct. 14, 2011, which is hereby incorporated by reference herein in its entirety.

What is claimed is:

1. A printing system in which document data is registered in a print service in accordance with a registration request from a client terminal, and the registered document data is pull-printed from a printing apparatus, the print service including;
    a determination unit configured to determine, in accordance with the registration request for the document data, whether a pull print instruction to the printing apparatus can be issued by communication from the client terminal, and
    a transmission unit configured to transmit a PIN code to the client terminal that is a source of the registration request without transmitting a URL of the print service corresponding to the registered document data if it is determined that the pull print instruction cannot be issued to the printing apparatus from the client terminal, wherein the PIN code has been issued when the document data has been registered to the print service, and to transmit the PIN code and the URL of the print service corresponding to the registered document data to the client terminal that is a source of the registration request if it is determined that the pull print instruction can be issued to the printing apparatus from the client terminal,
    wherein, when information representing the result of the determination represents that the pull print instruction can be issued by communication, the client terminal transmits the pull print instruction to the printing apparatus by communication.

2. The system according to claim 1, wherein the determination unit determines, based on address information of the source of the registration request in accordance with the registration request for the document data, whether the client terminal that is the request source belongs to an intranet, and, when the determination unit determines that the client terminal belongs to the intranet, determines that the pull print instruction to the printing apparatus can be issued from the client terminal by communication.

3. The system according to claim 1, wherein when the client terminal accesses an address, the print service controls an authentication service to perform login authentication and transmits, to the client terminal, an authentication token issued when the authentication is successful, and the client terminal transmits a print instruction for the registered document data to a selected printing apparatus together with the authentication token.

4. The system according to claim 1, wherein the print service presents, to the client terminal, a printing apparatus belonging to the same network as a network of the client terminal as a selection candidate of the printing apparatus.

5. The system according to claim 1, wherein the print service transmits, to the client terminal, information which represents that the pull print instruction to the printing apparatus can be issued by communication from the client terminal, and which contains information that specifies a printing apparatus.

6. A printing method for registering document data in a print service in accordance with a registration request from a client terminal, and pull-printing the registered document data from a printing apparatus, the printing method comprising:
  a step in which the print service determines, in accordance with the registration request for the document data, whether a pull print instruction to the printing apparatus can be issued by communication from the client terminal, transmits a PIN code to the client terminal that is a source of the registration request without transmitting a URL of the print service corresponding to the registered document data if it is determined that the pull print instruction cannot be issued to the printing apparatus from the client terminal, wherein the PIN code has been issued when the document data has been registered to the print service, and transmits the PIN code and the URL of the print service corresponding to the registered document data to the client terminal that is a source of the registration request if it is determined that the pull print instruction can be issued to the printing apparatus from the client terminal;
  a step in which, when information representing the result of the determination represents that the pull print instruction can be issued by communication, the client terminal transmits the pull print instruction to the printing apparatus by communication;
  a step in which the printing apparatus requests document data of the print service in accordance with the pull print instruction;
  a step in which the print service transmits the document data to the printing apparatus in accordance with a request; and
  a step in which the printing apparatus prints received document data.

7. A print service which registers document data in accordance with a registration request from a client terminal, and transmits the registered document data in accordance with a request from a printing apparatus, the print service comprising:
  a determination unit configured to determine, in accordance with the registration request for the document data, whether a pull print instruction to the printing apparatus can be issued by communication from the client terminal; and
  a transmission unit configured to transmit a PIN code to the client terminal that is a source of the registration request without transmitting a URL of the print service corresponding to the registered document data if it is determined that the pull print instruction cannot be issued to the printing apparatus from the client terminal, wherein the PIN code has been issued when the document data has been registered to the print service and transmit the PIN code and the URL of the print service corresponding to the registered document data to the client terminal that is a source of the registration request if it is determined that the pull print instruction can be issued to the printing apparatus from the client terminal,
  wherein, when information representing the result of the determination represents that the pull print instruction can be issued by communication, the client terminal transmits the pull print instruction to the printing apparatus by communication.

8. The service according to claim 7, wherein the determination unit determines, based on address information of the source of the registration request in accordance with the registration request for the document data, whether the client terminal that is the request source belongs to an intranet, and, when the determination unit determines that the client terminal belongs to the intranet, determines that the pull print instruction to the printing apparatus can be issued by communication from the client terminal.

9. The service according to claim 7, wherein when the client terminal accesses an address, the print service controls an authentication service to perform login authentication and transmits, to the client terminal, an authentication token issued when the authentication is successful.

10. The service according to claim 7, wherein the print service presents, to the client terminal, a printing apparatus belonging to the same network as a network of the client terminal as a selection candidate of the printing apparatus.

11. The service according to claim 7, wherein the print service transmits, to the client terminal, information which represents that the pull print instruction to the printing apparatus can be issued by communication from the client terminal, and which contains information that specifies a printing apparatus.

12. A non-transitory computer-readable recording medium for causing a computer to execute a printing method for registering document data in accordance with a registration request from a client terminal, and transmitting the registered document data in accordance with a request from a printing apparatus, the printing method comprising:
  determining, in accordance with the registration request for the document data, whether a pull print instruction to the printing apparatus can be issued by communication from the client terminal;
  transmitting a PIN code to the client terminal that is a source of the registration request without transmitting a URL of a print service corresponding to the registered document data if it is determined that the pull print instruction cannot be issued to the printing apparatus from the client terminal, wherein the PIN code has been issued when the document data has been registered to the print service; and
  transmitting the PIN code and the URL of the print service corresponding to the registered document data to the client terminal that is a source of the registration request if it is determined that the pull print instruction can be issued to the printing apparatus from the client terminal.

* * * * *